Sept. 8, 1953   V. IVANOFF   2,651,672
FLUID SEALING DEVICE FOR ELECTRICAL CONDUCTORS
Filed Jan. 20, 1950
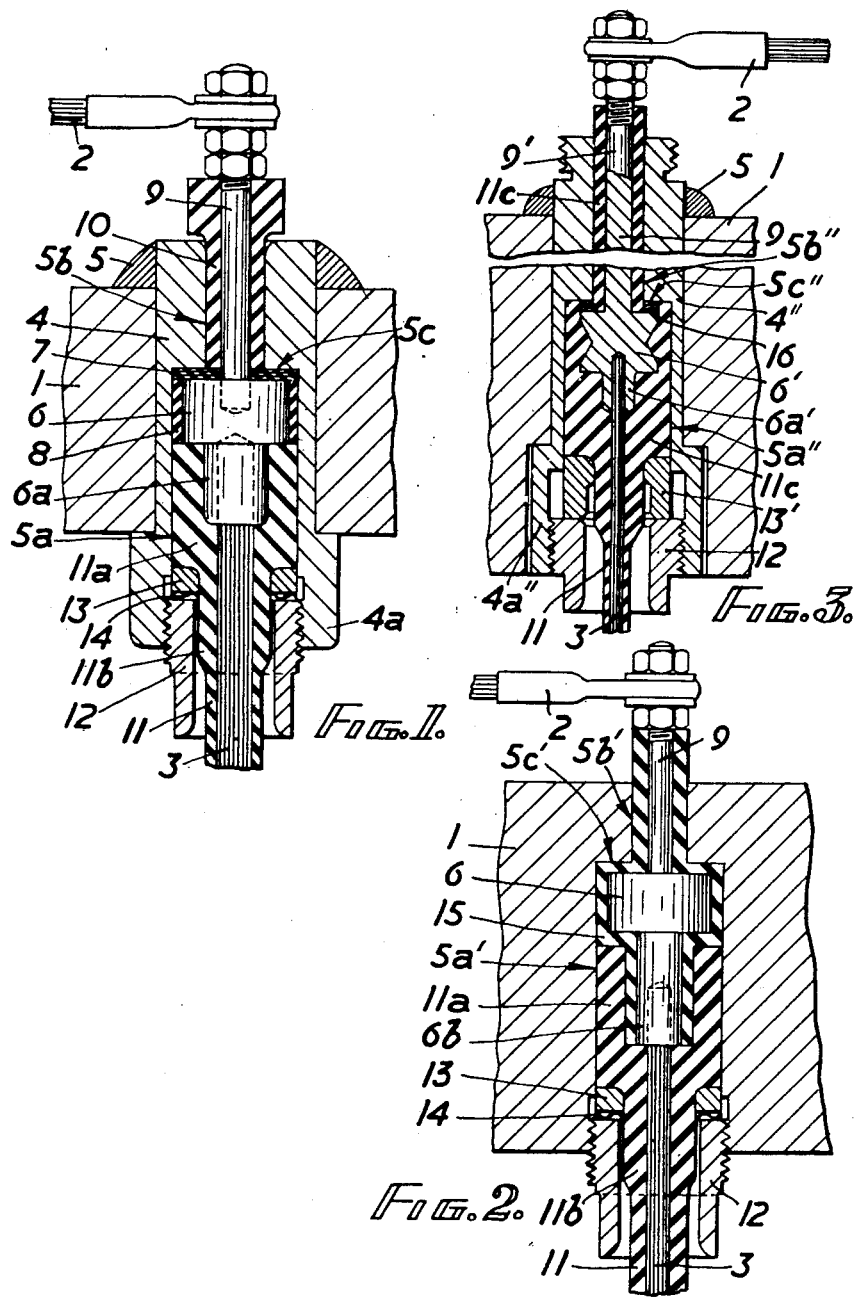
Inventor
VICTOR IVANOFF
By
Attorney

UNITED STATES PATENT OFFICE 2,651,672

FLUID SEALING DEVICE FOR ELECTRICAL CONDUCTORS

Victor Ivanoff, Luton, England

Application January 20, 1950, Serial No. 139,717
In Great Britain January 20, 1949

9 Claims. (Cl. 174—152)

This invention relates to fluid sealing devices for electrical conductors, and particularly for electrical conductors which pass through a wall subjected to different pressures on its two sides. The object of the invention is the provision of improvements in such fluid sealing devices and the invention consists broadly of a fluid sealing device for an electrically conductive path passing through a wall subjected to different fluid pressures on its two sides, wherein a stepped hole is formed through said wall having a shoulder which faces towards the high pressure side of the wall, and said conductive path comprises a conductive thrust member located in said hole so as to abut against said shoulder, a conductor leading from said thrust member to the low pressure side of said wall and a conductor leading from said thrust member to the high pressure side of said wall, said last-named conductor being surrounded by flexible sealing material within said hole and abutting against said thrust member, and adjustable means being provided for precompressing said flexible sealing material from the high pressure side of the wall whereby said material makes a seal against both said thrust member and the inner periphery of said hole.

In order that the invention may be the more clearly understood certain sealing devices in accordance therewith will now be described reference being made to the accompanying drawings wherein:

Figure 1 is a sectional elevation of one of said devices.

Figure 2 is a similar view of another device.

Figure 3 is a similar view of a third device.

Each of the devices illustrated is an example of the invention as applied to a submersible electric motor structure in which the motor is enclosed in a casing which is filled with fluid which may be permanently under pressure. The motor, in the usual way, is wound with cable insulated with flexible watertight materials such as plastics or natural or synthetic rubber. Conductive paths must be provided each passing in insulating relation through a hole in the wall of the motor casing, from an insulated cable of the motor inside the casing to a supply cable outside. In accordance with the present invention a seal is formed which prevents the possibility of any leakage of liquid through such hole, despite the pressure within said casing. In all three figures, the wall of the casing is designated by the reference 1, the outside supply cable by the reference 2, and the inside cable of the motor, which is to be connected to said outside supply cable, by the reference 3.

Referring first to Figure 1, the wall 1 of the casing is shown as having a straight sided hole bored through it which is filled by a steel plug or cartridge 4 secured in place by welding 5. This plug or cartridge 4 therefore forms essentially part of the wall of the casing. The hole through the wall of the casing for the conductive path connecting the cable 2 with the cable 3 is formed by boring through said plug or cartridge 4.

This hole is stepped so that it comprises a larger diameter portion 5a and a smaller diameter portion 5b, the larger diameter portion opening to the inside of the casing and the smaller diameter portion to the outer atmosphere. A shoulder 5c is thus formed in said hole which faces towards the inside of the casing.

Within the larger diameter portion 5a of the hole is located a cylindrical thrust member 6 of conducting material, say electrical bronze. Said thrust member 6 bears against said shoulder 5c, with an insulating thrust washer 7, of say mica, in between, and its circumferential periphery is insulated from the inner periphery of the hole by means of a suitable insulating bush 8 of say a synthetic resin such as Bakelite. A rod 9 which is conductively connected to said thrust member 6, say by screwing thereinto and fastening by soldering, passes through the smaller diameter portion 5b of the hole to the outer atmosphere, being insulated from said hole by a suitable bush 10 of say synthetic resin, and at its outer end it is adapted to be connected to the outside cable 2.

The inside cable 3 passes centrally into the larger diameter portion 5a of the hole and is conductively secured, as by soldering, to the centre of the thrust member 6, and thus the electrical connection is completed. Said inside cable 3 is coated, as before stated, with flexible insulating watertight material 11 such as plastics for instance polyvinyl chloride. The cable end is stripped of its insulating coating to enable it to be connected to said thrust member 6, and the stripped portion afterwards has insulation of the same material molded on to it and fused integrally with the existing insulation and shaped to form an enlarged surround or collar 11a which fits closely into the larger diameter portion 5a of the hole and abuts against the face of the thrust member. A pre-compressing nut 12 having a screw-threaded outer periphery and a central bore through which the insulated cable 3 passes is screwed into the larger diameter portion 5a of the hole so as to press against the enlarged collar 11a, and said nut is screwed up sufficiently tightly to pre-compress said enlarged collar sufficiently to cause the material thereof to seal with the thrust member 6 and also with the surrounding periphery of the hole, but not tightly enough to cause any appreciable cold flow of said material back through the bore of the nut 12. The enlarged collar 11a has a neck portion 11b which extends some distance into the bore of the nut which it closely fills. This neck portion 11b joins the normal insulation 11 of the cable which is of smaller diameter so that a clearance exists between said normal insulation and the bore of the nut, to which clearance the liquid within the casing will have access. A washer 13 of say steel is preferably provided between the pre-compressing nut 12 and the enlarged molded collar 11a. The neck portion of said collar fits closely into the bore of said washer.

It will be seen that, at small liquid pressures, the thrust of the pre-compressing nut 12 is enough to make a seal by forcing the material of the enlarged collar 11a against the thrust member 6 and against the periphery of the hole portion 5a. At higher pressures the liquid will simply force the material of said collar the more tightly against said thrust member and against the periphery of said hole portion. Thus a gland is constituted which is self sealing under pressure. As the liquid pressure is applied equally to all the exposed surfaces of the moulded insulating material, there will be no tendency for it to be squeezed back out of the seal pocket through the bore of the pre-compressing nut 12.

If desired a spring washer 14, for instance a corrugated washer or other type of spring, may be interposed between the pre-compressing nut 12 and the washer 13. The purpose of this spring washer 14 is to ensure a slight initial pressure on the flexible insulation. In the absence of such a spring washer any cold flow of the insulation through the opening in the pre-compressing nut 12 or into any recesses or unevenness of the surface of the hole may result in the seal becoming very slightly slack.

It will be seen that, for connecting the cable 3 to the thrust member 6, the latter is formed with a reduced coaxial stalk 6a bored to receive said cable 3. The plug or cartridge 4 is formed with a slightly enlarged head 4a at its inner end which abuts against the inner surface of the wall 1 of the casing when it is fully home. The outer end of said plug or cartridge projects slightly beyond the outer surface of the casing wall, and the weld 5 is an annular weld between this projecting end and the casing wall.

It will be appreciated that this construction has the advantage that the plain hole for the plug or cartridge can be easily machined in the casing wall from outside. Also, by cutting off the projecting outer end of the plug or cartridge, the latter can be easily removed and another one substituted. Obviously however the plug or cartridge 12 can be dispensed with and the stepped hole formed direct in the wall of the casing.

Referring now to Figure 2 this illustrates a variation of the arrangement of Figure 1 which has for its object enhanced safety by lengthening the path of electrical leakage in the event of slight leakage of water or other conducting liquid. In accordance with this variation the thrust member 6 has a relatively long stalk or tail 6b projecting axially from it towards the inside of the motor casing and the inside cable core 3 is connected to the end of this tail. The whole of the unit, consisting of said thrust member 6 together with its tail 6b and the rod 9 projecting outwardly from it, is encased in a hard insulating compound 15 capable of carrying considerable mechanical loads without appreciable cold flow such as a plastic known as Bakelite. The flexible insulation 11a forming the enlarged surround or collar can either fit snugly over the insulating covering 15 of the said stalk or tail, or else be molded to it. The first alternative allows the whole of the aforesaid unit to be one integral piece, but allows a film of liquid to form in the event of leakage. The second alternative is more difficult to make but guards completely against a conducting liquid film inside the gland. No electrical failure will be caused by liquid leakage unless it reaches the exposed end of the terminal.

In Figure 2 the plug or cartridge 4 has been omitted and a stepped hole 5a', 5b' is made direct in the wall 1 of the casing to form a shoulder 5c', but obviously the plug or cartridge 4 could be employed with the arrangement of Figure 2 equally with that of Figure 1.

In Figure 2 also the insulating parts 7, 8 and 10 of Figure 1 are obviously not required as their insulating function is supplied by the compound 15. In other respects Figure 2 is the same as Figure 1 and the same references are applied to the corresponding parts of the two figures.

Referring now to Figure 3 this is, in the main, similar to Figure 1. The cartridge 4" comprises a wide portion 5a" and a narrow portion 5b" to form an enlarged shoulder 5c". The head 4a" of the cartridge 4" abuts against a shoulder formed in the hole through wall 1 by countersinking the hole. The principal difference is that the insulating parts 7, 8 and 10 are dispensed with and one integral covering of moulding material 11c covers the whole of the thrust member 6' together with the stalk 6a' and rod 9 and joins the coating 11 of the cable 3. Member 6' is shown as slightly waisted. This material 11c is the same material (say polyvinyl chloride) as the material 11 and is fused into an integral junction therewith, and thus a single homogeneous coating of insulating material extends from the cable 3 to the outer end of a rod 9' shown integral with the thrust member. In order that the portion of this coating which lies between the thrust member 6' and the shoulder 5c" of the bore hole in the cartridge shall be able to resist, without gradual deformation, the heavy thrust caused by the fluid pressure within the casing wall 1, a reinforcing washer 16, made of glass fibre fabric or some similar strong insulating material with a high melting point, is inserted into this portion of the coating material during the molding operation and becomes permanently embedded in and insulated by said coating material, and thus a mechanically strong thrust portion is provided capable of resisting the aforesaid heavy thrust.

It will be appreciated that the unbroken covering of insulation afforded by this embodiment of the invention reduces the risk of electrical surface leakage.

Washer 13' is shown axially extended. The spring washer 14 is omitted though this could of course be employed if desired.

What is claimed is:

1. In combination, a wall subjected to different fluid pressures on its two sides, said wall having a hole through it formed with a surface facing towards the high pressure side of said wall, a flexible electric cable on the high pressure side of said wall, said cable comprising a conducting cable core and an insulating covering therefor which protects said cable from the fluid on said high pressure side, conducting means on the low pressure side of said wall, a conducting thrust member located in and insulated from, said hole, and connected on the high pressure side to said cable core and on the low pressure side to said conducting means, said thrust member having a first surface facing towards the low pressure side and a second surface facing towards the high pressure side, the said surface of said hole coacting with the said first surface of said thrust member to restrain said thrust member against movement through said hole towards the low pressure side, and said second surface of said thrust member being within said hole, flexible insulating sealing material secured around said insulating cable covering and located in said hole against said second surface of said thrust member, an apertured nut, through which the cable passes, screwed into said hole from the high pressure side for pre-compressing said sealing material against said second surface of said thrust member so as to make a seal with said second surface of said thrust member and with the inner periphery of said hole, said sealing material being exposed to the fluid pressure on the high pressure side, whereby said seal is augmented, and insulation material resistant to cold deformation disposed between said surface of said hole and said first surface of said thrust member.

2. In combination, a wall subjected to different fluid pressures on its two sides, said wall having a hole through it formed with a surface facing towards the high pressure side of said wall, a flexible electric cable on the high pressure side of said wall, said cable comprising a conducting cable core and an insulating covering therefor which protects said cable core from the fluid on said high pressure side, conducting means on the low pressure side of said wall, a conducting thrust member located in, and insulated from, said hole, said thrust member being connected on the high-pressure side to said cable core, and on the low-pressure side to said conducting means, said thrust member being formed with a first surface facing towards the low pressure side and a second surface facing towards the high-pressure side, the said surface of said hole coacting with the said first surface of said thrust member to restrain said thrust member against movement through said hole towards the low-pressure side, and said second surface of said thrust member being within said hole, an enlarged surround of the same material as said insulating covering united integrally around the latter and located in said hole against said second surface of said thrust member, an apertured nut through which the cable passes, screwed into said hole from the high-pressure side for pre-compressing said surround against said second surface of said thrust member so as to make a seal with said second surface of said thrust member, and with the inner periphery of said hole, said surround being exposed to the fluid pressure on the high-pressure side, whereby said seal is augmented, and insulation material resistant to cold deformation disposed between said surface of said hole and said first surface of said thrust member.

3. In combination, a wall subjected to different fluid pressures on its two sides, said wall having a hole through it, a flexible electric cable on the high pressure side of said wall, said cable comprising a conducting cable core and an insulating covering therefor which protects said cable from the fluid on said high pressure side, conducting means on the low pressure side of said wall, a conducting thrust member located in and insulated from, said hole, and connected on the high pressure side to said cable core and on the low pressure side to said conducting means, said thrust member having a shoulder within said hole facing the high pressure side, means restraining said thrust member against movement through said hole towards the low pressure side, flexible insulating sealing material secured around said insulating cable covering and located in said hole against said shoulder, an apertured nut through which the cable passes, screwed into said hole from the high-pressure side for pre-compressing said sealing material against said shoulder, whereby it makes a seal with said shoulder and with the inner periphery of said hole, and a spring washer interposed between said nut and said sealing material to ensure the maintenance of the pre-compression of said sealing material, said sealing material being exposed to the fluid pressure on the high-pressure side, whereby said seal is augmented.

4. In combination, a wall subjected to different fluid pressures on its two sides, said wall having a hole through it formed to provide a shoulder facing towards the high pressure side, a flexible electric cable on the high pressure side of said wall, said cable comprising a conducting cable core and an insulating covering therefor which protects said cable core from the fluid on said high pressure side, a conducting thrust member located in said hole on the high pressure side of said shoulder, a rigid conducting rod extending from said thrust member through said hole to the low pressure side, said thrust member being connected on the high pressure side to said cable core and being formed to provide a shoulder within said hole facing said high pressure side, insulation surrounding said rod and said thrust member and between said thrust member and the shoulder of said hole, an enlarged surround of the same material as said insulating covering united integrally around the latter and located in said hole on the high pressure side of the thrust-member shoulder, an apertured nut through which the cable passes, screwed into said hole from the high pressure side for pre-compressing said surround against said shoulder, whereby it makes a seal with said shoulder and with the inner periphery of said hole, said surround being exposed to the fluid pressure on the high pressure side, whereby said seal is augmented.

5. In combination, a wall subjected to different fluid pressures on its two sides, said wall having a hole through it formed to provide a shoulder facing towards the high-pressure side, a flexible electric cable on the high pressure side of said wall, said cable comprising a conducting cable core and an insulating covering therefor which protects said cable core from the fluid on said high pressure side, a conducting thrust member located in said hole on the high pressure side of said shoulder, a rigid conducting rod extending from said thrust member through said hole to the low pressure side, said thrust member being connected on the high pressure side to said cable core and being formed to provide a shoulder within said hole facing said high pressure side, an enlarged surround of the same material as said insulating covering united integrally around the latter said surround being located in said hole against said thrust member shoulder and extending to insulate said thrust member and said rod from said hole and from the shoulder of said hole, an apertured nut through which the cable passes, screwed into said hole from the high-pressure side for pre-compressing said surround against said shoulder, whereby it makes a seal with said shoulder and with the inner periphery of said hole, said surround being exposed to the fluid pressure on the high pressure side, whereby said seal is augmented.

6. In combination, a wall subjected to different fluid pressures on its two sides, said wall having a hole through it formed to provide a shoulder facing towards the high pressure side, a flexible electric cable on the high pressure side of said wall, said cable comprising a conducting cable core and an insulating covering therefor which protects said cable core from the fluid on said high pressure side, a conducting thrust member located in said hole on the high pressure side of said shoulder, a rigid conducting rod extending from said thrust member through said hole to the low pressure side, said thrust member being connected on the high pressure side to said cable core and being formed to provide a shoulder within said hole facing said high pressure side, an enlarged surround of the same material as said insulating covering united integrally around the latter said surround being located in said hole against said thrust member shoulder and extending to insulate said thrust member and said rod from said hole and from the shoulder of said hole, a reinforcing washer of insulating material embedded in and permeated by the portion of said insulating surround between said thrust member and the shoulder of said hole to enable said portion of the surround to resist thrust of said thrust member against said shoulder of said hole, without continuous deformation, an apertured nut through which the cable passes, screwed into said hole from the high pressure side for pre-compressing said surround against said shoulder whereby it makes a seal with said shoulder and with the inner periphery of said hole, said surround being exposed to the fluid pressure on the high pressure side, whereby said seal is augmented.

7. In combination, a wall subjected to different fluid pressures on its two sides, said wall having a hole through it formed to provide a shoulder facing towards the high-pressure side, a flexible electric cable on the high pressure side of said wall, said cable comprising a conducting cable core and an insulating covering therefor which protects said cable core from the fluid on said high pressure side, a conducting thrust member located in said hole on the high pressure side of said shoulder, a rigid conducting rod extending from said thrust member through said hole to the low pressure side, a reduced stalk extending from said thrust member towards the high pressure side, the extremity of said stalk being connected to said cable core, a layer of hard insulating material encasing the unit consisting of said thrust member, said rod and said stalk, an enlarged surround of the same material as said insulating covering united integrally around the latter and located in said hole around said stalk, an apertured nut through which the cable passes, screwed into said hole from the high pressure side for pre-compressing said surround against said thrust member, whereby it makes a seal with said thrust member and with the inner periphery of said hole, said surround being exposed to the fluid pressure on its high pressure side whereby said seal is augmented.

8. In combination, a wall subjected to different fluid pressures on its two sides, said wall having a hole through it, a flexible electric cable on the high pressure side of said wall, said cable comprising a conducting cable core and an insulating covering therefor which protects said cable core from the fluid on said high pressure side, conducting means on the low pressure side of said wall, a conducting thrust member located in, and insulated from, said hole, said thrust member being connected on the high pressure side to said cable core, and on the low pressure side to said conducting means said thrust member being formed with a shoulder within said hole facing the high pressure side means restraining said thrust member against movement through said hole towards the low pressure side, an enlarged surround of the same material as said insulating covering united integrally around the latter and located in said hole against said shoulder, and an apertured nut through which said cable passes, screwed into said hole from the high pressure side for pressing said surround against said shoulder, whereby it makes a seal with said shoulder and with the inner periphery of said hole.

9. In combination, a wall subjected to different fluid pressures on its two sides, said wall having a hole therethrough formed with a surface facing towards the high pressure side of said wall, an electric cable on the high pressure side of said wall, said cable comprising a conducting cable core and a protective insulating covering therefor, a conducting thrust member located in said hole on the high pressure side of said surface of said hole, means for connecting said thrust member to conducting means on the low pressure side of said wall, said thrust member being connected on the high pressure side to said cable core and having a surface within said hole facing the high pressure side of said wall, an enlarged surround member of the same material as said insulating covering united integrally with the latter, said surround member being located in said hole against said surface of said thrust member to form a seal and extending to insulate said thrust member from said surface of said hole, reinforcing means of insulating material embedded in and permeated by the portion of said insulating surround member between said thrust member surface and said surface of said hole, to enable said portion of the surround member to resist thrust of said thrust member against said surface of said hole, without continuous deformation, said surround member being exposed to the fluid pressure on the high pressure side, whereby said seal is augmented.

VICTOR IVANOFF.

References Cited in the file of this patent

UNITED STATES PATENTS

| Number | Name | Date |
|---|---|---|
| 1,610,442 | Gorton | Dec. 14, 1926 |
| 1,847,059 | Beshara | Feb. 23, 1932 |
| 2,145,744 | Whitney | Jan. 31, 1939 |
| 2,361,215 | Lamberger et al. | Oct. 24, 1944 |
| 2,422,379 | Westman | June 17, 1947 |
| 2,438,572 | McCormack | Mar. 30, 1948 |

FOREIGN PATENTS

| Number | Country | Date |
|---|---|---|
| 255,473 | Great Britain | Apr. 14, 1927 |